United States Patent
Hitomi et al.

(10) Patent No.: US 11,228,988 B2
(45) Date of Patent: *Jan. 18, 2022

(54) COMMUNICATION CIRCUIT AND CONTROL METHOD FOR COMMUNICATION CIRCUIT

(71) Applicant: Murata Manufacturing Co., Ltd., Kyoto (JP)

(72) Inventors: Shinya Hitomi, Nagaokakyo (JP); Hidenori Obiya, Nagaokakyo (JP); Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/898,206

(22) Filed: Jun. 10, 2020

(65) Prior Publication Data

US 2020/0396700 A1 Dec. 17, 2020

(30) Foreign Application Priority Data

Jun. 14, 2019 (JP) .............................. JP2019-111011

(51) Int. Cl.
*H04W 52/36* (2009.01)
*H04W 52/34* (2009.01)

(52) U.S. Cl.
CPC ........... *H04W 52/36* (2013.01); *H04W 52/34* (2013.01)

(58) Field of Classification Search
CPC .............................. H04W 52/34; H04W 52/36
USPC .............................. 455/522, 69, 452.1, 67.11
See application file for complete search history.

(56) References Cited

U.S. PATENT DOCUMENTS

| | | | |
|---|---|---|---|
| 2015/0092562 A1* | 4/2015 | Gu ................. | H04J 11/005 370/237 |
| 2016/0044606 A1* | 2/2016 | Yin ................. | H04W 52/146 455/450 |
| 2016/0127029 A1* | 5/2016 | Wloczysiak ....... | H04B 1/006 375/318 |
| 2017/0019867 A1* | 1/2017 | Kim ................. | H04L 5/0037 |
| 2019/0223077 A1 | 7/2019 | Kwok | |

FOREIGN PATENT DOCUMENTS

JP 2016-92827 A 5/2016
JP 2019-62444 A 4/2019

OTHER PUBLICATIONS

Qualcomm Incorporated, PSD difference for intra-band EN-DC Pcmax, 3GPP TSG-RAN WG4 #90, 2019, pp. 1-4, R4-1901879, Qualcomm Incorporated, Athens, Greece.

* cited by examiner

*Primary Examiner* — John J Lee
(74) *Attorney, Agent, or Firm* — Pearne & Gordon LLP

(57) ABSTRACT

A communication circuit includes a first transfer circuit that includes a first transmitter circuit, and a second transfer circuit that includes a second transmitter circuit that can transmit a signal simultaneously with the first transmitter circuit. The second transmitter circuit is configured to be placed in a transmission halt state when a difference between requested power and scheduled power is greater than a predetermined value, the requested power being requested transmission power, the scheduled power being transmission power to be transmitted based on the requested power.

19 Claims, 3 Drawing Sheets

COMMUNICATION CIRCUIT AND CONTROL METHOD FOR COMMUNICATION CIRCUIT

CROSS REFERENCE TO RELATED APPLICATION

The present application is based on and claims priority of Japanese Patent Application No. 2019-111011 filed on Jun. 14, 2019. The entire disclosure of the above-identified application, including the specification, drawings and claims is incorporated herein by reference in its entirety.

BACKGROUND

The present disclosure relates to a communication circuit and a control method for the communication circuit, and in particular to a communication circuit that includes two transmitter circuits that can simultaneously transmit signals.

In view of a transition to the fifth generation mobile communication system (5G) referred to as New Radio (NR), the Third Generation Partnership Project (3GPP), which is a project of defining specifications for a mobile communication system, has been requesting that a terminal device be able to simultaneously transmit a signal in accordance with the fourth generation mobile communication system (4G) referred to as Long Term Evolution (LTE) or Evolved Universal Terrestrial Radio Access (E-UTRA), and a signal in accordance with 5G (through E-UTRA-NR dual connectivity (EN-DC)).

To achieve this, various types of communication methods that support EN-DC have been conventionally proposed (for example, refer to Japanese Unexamined Patent Application Publication No. 2019-62444). Japanese Unexamined Patent Application Publication No. 2019-62444 has proposed a technology of allowing efficient communication between a base station device and a terminal device even if conventional DC implemented using an LTE cell is applied to NR.

BRIEF SUMMARY

In accordance with the requirements (TS38.101-3) defined by 3GPP, a difference in power spectral density (PSD) between a master cell group (MCG) and a secondary cell group (SCG) needs to be at most 6 dB if the difference is greater than 6 dB. Stated differently, in EN-DC, there is a communication band for which a terminal device is requested to adjust the difference between NR transmission power and requested power that is transmission power requested from a base station device to at most a predetermined value (6 dBm at present). However, the terminal device according to Japanese Unexamined Patent Application Publication No. 2019-62444 has a problem that communication does not necessarily comply with the requirements since such requested power is not taken into consideration.

Specifically, minimum transmission power is necessary to adjust a difference between NR transmission power and requested power from the base station device to at most a predetermined value, yet if LTE transmission is already conducted, a total of LTE transmission power and NR transmission power is not allowed to exceed permissible transmission power, and thus a difference between NR transmission power and requested power cannot be necessarily adjusted to at most the predetermined value. Here, the permissible transmission power is the upper limit of transmission power defined for a power class to which the terminal device belongs.

In view of this, the present disclosure is to provide a communication circuit that can perform communication in compliance with the requirements in DC, and a control method for the communication circuit.

Solution to Problem

In order to provide such a communication circuit, a communication circuit according to an embodiment of the present disclosure includes: a first transmitter circuit; and a second transmitter circuit configured to transmit a signal simultaneously with the first transmitter circuit. The second transmitter circuit is configured to be placed in a transmission halt state when a difference between requested power and scheduled power is greater than a predetermined value, the requested power being requested transmission power, the scheduled power being transmission power to be transmitted based on the requested power.

In order to provide such a control method, a control method for a communication circuit according to an embodiment of the present disclosure is a control method for a communication circuit that includes a first transmitter circuit, and a second transmitter circuit configured to transmit a signal simultaneously with the first transmitter circuit, the control method including: calculating, for the second transmitter circuit, scheduled power, based on a difference between maximum transmission power and requested power that is requested transmission power, the scheduled power being transmission power to be transmitted based on the requested power; determining whether a difference between the requested power and the scheduled power calculated is greater than a predetermined value; and performing control to place the second transmitter circuit in a transmission halt state when the difference between the requested power and the scheduled power is determined to be greater than the predetermined value.

Advantageous Effects

According to the present disclosure, a communication circuit that can perform communication in compliance with the requirements in DC, and a control method for the communication circuit are provided.

BRIEF DESCRIPTION OF THE SEVERAL VIEWS OF THE DRAWINGS

These and other advantages and features will become apparent from the following description thereof taken in conjunction with the accompanying Drawings, by way of non-limiting examples of embodiments disclosed herein.

DETAILED DESCRIPTION

The following describes in detail embodiments of the present disclosure, with reference to the drawings. Note that the embodiments described below each describes a specific example of the present disclosure. The numerical values, circuit components, the connection of the circuit components, processing steps, the order of performing the processing steps, and others indicated in the following embodiments are mere examples, and are not intended to limit the present disclosure. The drawings do not necessarily provide strictly accurate illustration. Throughout the drawings, the same numeral is given to substantially the same element, and redundant description may be omitted or simplified.

Figure 1:
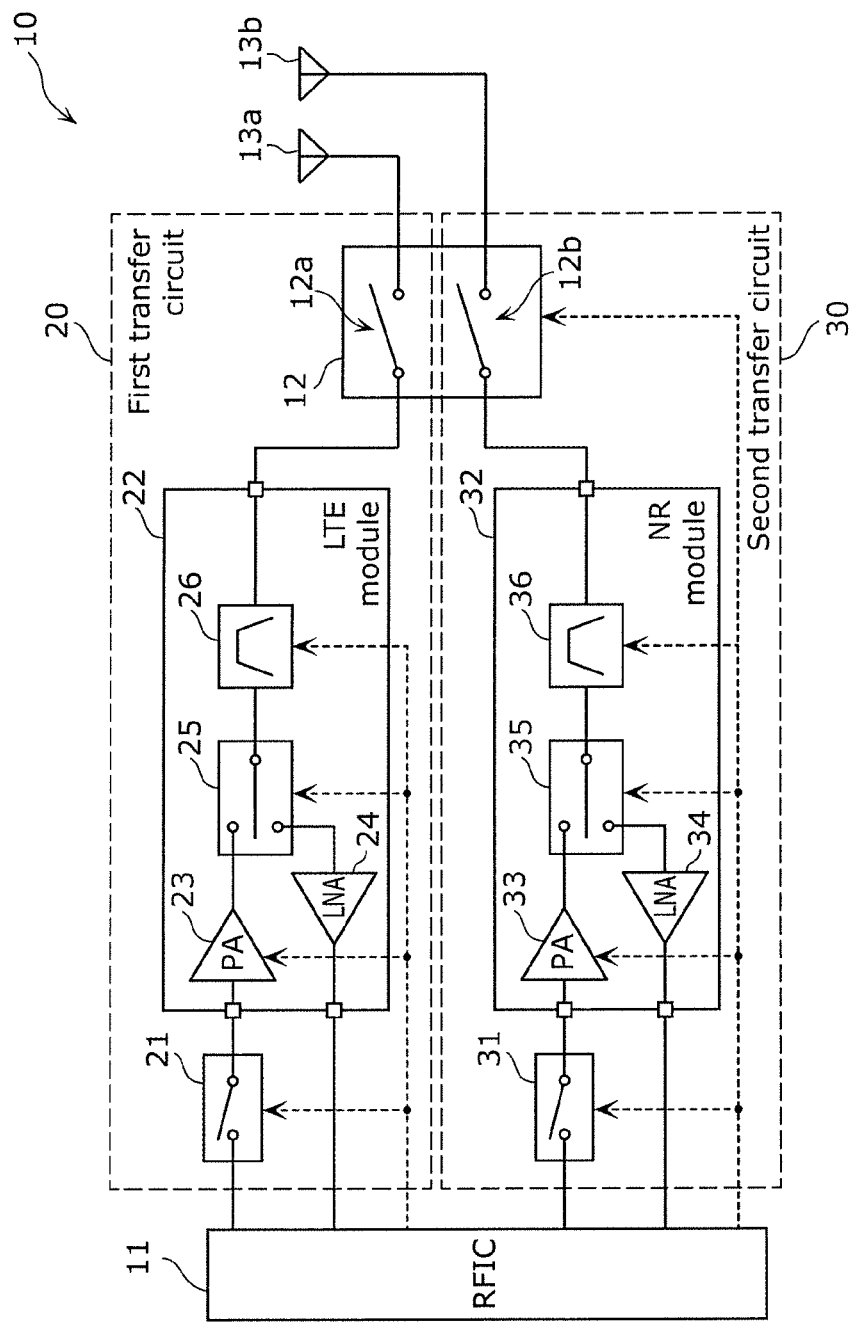
FIG. 1 is a block diagram of a communication circuit according to an embodiment.

FIG. 1 is a block diagram of communication circuit 10 according to an embodiment. Communication circuit 10 supports EN-DC, and includes radio frequency (RF) signal processing circuit (RF integrated circuit (RFIC)) 11, first transfer circuit 20, second transfer circuit 30, antenna switch 12, first antenna 13a, and second antenna 13b. Note that in the present embodiment, communication circuit 10 is included in a terminal device that communicates with base station devices.

First transfer circuit 20 is an example of a transfer circuit that includes a first transmitter circuit, and in the present embodiment, is a radio frequency circuit that transmits and receives signals in accordance with LTE (more specifically, E-UTRA). First transfer circuit 20 includes input switch 21, LTE module 22, and one switch (first antenna switch 12a) in antenna switch 12. Note that the first transmitter circuit corresponds to a circuit for transmission that includes, among the elements of first transfer circuit 20, input switch 21, first antenna switch 12a, and power amplifier (PA) 23, transmission reception switch 25 and bandpass filter 26 that are included in LTE module 22.

Input switch 21 connects and disconnects power amplifier 23 to/from RF signal processing circuit 11, allows and interrupts input of a transmission signal output by RF signal processing circuit 11 to power amplifier 23, under the control of RF signal processing circuit 11. Input switch 21 includes a field effect transistor (FET), for example.

LTE module 22 includes integrated circuit components for transmitting and receiving signals in accordance with E-UTRA, which are power amplifier 23, low noise amplifier (LNA) 24, transmission reception switch 25, and bandpass filter 26. Power amplifier 23 is a circuit that amplifies power of a transmission signal input through input switch 21. Low noise amplifier 24 is a circuit that amplifies, with low noise, a reception signal input through transmission reception switch 25. Power amplifier 23 and low noise amplifier 24 each include a bipolar transistor and/or an FET, for example. Note that LTE module 22 also includes a switch circuit (not illustrated) that allows and stops supply of power from a power supply circuit (not illustrated) to power amplifier 23 under the control of RF signal processing circuit 11. LTE module 22 may be replaced with a discrete circuit that includes separate circuit components.

Transmission reception switch 25 is a single pole double throw (SPDT) switch that includes one common terminal connected to bandpass filter 26, and two selection terminals connected to the output terminal of power amplifier 23 and the input terminal of low noise amplifier 24. Transmission reception switch 25 performs time division duplex (TDD) for transmitting and receiving signals in a time sharing manner by switching between input of a transmission signal output from power amplifier 23 to bandpass filter 26 and input of a reception signal output from bandpass filter 26 to low noise amplifier 24, under the control of RF signal processing circuit 11. Transmission reception switch 25 includes a plurality of FETs, for example. Note that transmission reception switch 25 may be replaced with a duplexer that includes a transmission filter and a receiving filter. In this case, frequency division duplex (FDD) for simultaneously transmitting and receiving signals using different frequency bands can be performed.

Bandpass filter 26 allows a signal in a frequency band used for E-UTRA to pass through. In the present embodiment, bandpass filter 26 is a group of bandpass filters having frequency bands used for E-UTRA (for example, frequency bands shown in Table 1 below), and allows a signal in a frequency band of one of the bandpass filters selected by RF signal processing circuit 11 to pass through. Bandpass filter 26 includes, for example, a plurality of surface acoustic wave filters, and a switch circuit that selects one of the surface acoustic wave filters and allows a signal to pass through.

TABLE 1

| Frequency band | Uplink (MHz) | Downlink (MHz) |
| --- | --- | --- |
| B2 | 1850-1910 | 1930-1990 |
| B3 | 1710-1785 | 1805-1880 |
| B13 | 777-787 | 746-756 |
| B20 | 832-862 | 791-821 |
| B26 | 814-849 | 859-894 |
| B41 | 2496-2690 | 2496-2690 |
| B42 | 3400-3600 | 3400-3600 |
| B71 | 663-698 | 617-652 |

Second transfer circuit 30 is an example of a transfer circuit that includes a second transmitter circuit that can transmit, simultaneously with the first transmitter circuit, a signal with lower transmission power than that of the first transmitter circuit. In the present embodiment, second transfer circuit 30 is a radio frequency circuit that transmits and receives signals in accordance with NR, and includes input switch 31, NR module 32, and one switch (second antenna switch 12b) in antenna switch 12. Note that the second transmitter circuit corresponds to a circuit for transmission that includes, among the elements of second transfer circuit 30, input switch 31 and one switch (second antenna switch 12b) in antenna switch 12, and power amplifier (PA) 33, transmission reception switch 35, and bandpass filter 36 that are included in NR module 32.

Input switch 31 is an example of a second switch connected to the input terminal of power amplifier 33 included in NR module 32, and allows and interrupts input of a transmission signal output by RF signal processing circuit 11 to power amplifier 33, under the control of RF signal processing circuit 11. Input switch 31 includes an FET, for example.

NR module 32 includes integrated circuit components for transmitting and receiving signals in accordance with NR, and includes power amplifier 33, low noise amplifier (LNA) 34, transmission reception switch 35, and bandpass filter 36. Power amplifier 33 is a circuit that amplifies power of a transmission signal input through input switch 31. Low noise amplifier 34 is a circuit that amplifies, with low noise, a reception signal input through transmission reception switch 35. Power amplifier 33 and low noise amplifier 34 each include a bipolar transistor and/or an FET, for example. Note that NR module 32 also includes a switch circuit (not illustrated) that allows and stops supply of power from a power supply circuit (not illustrated) to power amplifier 33, under the control of RF signal processing circuit 11. NR module 32 may be replaced with a discrete circuit that includes separate circuit components.

Transmission reception switch 35 is an example of a second switch connected to the output terminal of power amplifier 33, and is an SPDT switch that includes one common terminal connected to bandpass filter 36, and two selection terminals connected to the output terminal of power amplifier 33 and the input terminal of low noise amplifier 34. Transmission reception switch 35 performs TDD by switching between, under the control of RF signal processing circuit 11, input of a transmission signal output from power amplifier 33 to bandpass filter 36 and input of a reception signal output from bandpass filter 36 to low noise amplifier 34. Transmission reception switch 35 includes a plurality of FETs, for example. Note that transmission reception switch 35 may be replaced with a duplexer that includes a transmission filter and a receiving filter. In this case, FDD is performed.

Bandpass filter 36 allows a signal in a frequency band used for NR to pass through. In the present embodiment, bandpass filter 36 is a group of bandpass filters having frequency bands used for NR (for example, frequency bands shown in Table 2 below), and allows a signal in a frequency band of one of the bandpass filters selected by RF signal processing circuit 11 to pass through. Bandpass filter 36 includes, for example, a plurality of surface acoustic wave filters, and a switch circuit that selects one of the surface acoustic wave filters and allows a signal to pass through.

TABLE 2

| Frequency band | Uplink (MHz) | Downlink (MHz) |
|---|---|---|
| n3 | 1710-1785 | 1805-1880 |
| n26 | 814-849 | 859-894 |
| n28 | 703-748 | 758-803 |
| n41 | 2496-2690 | 2496-2690 |
| n66 | 1710-1780 | 2110-2200 |
| n71 | 663-698 | 617-652 |
| n77 | 3300-4200 | 3300-4200 |
| n78 | 3300-3800 | 3300-3800 |

Examples of the combination of simultaneously used frequency bands of bandpass filter 26 of first transfer circuit 20 and bandpass filter 36 of second transfer circuit 30 include B2-n66, B3-n3, B3-n77, B3-n78, B13-n26, B20-n28, B26-n71, B41-n41, B42-n77, B42-n78, and B71-n71.

Antenna switch 12 includes single pole single throw (SPST) first antenna switch 12a that connects and disconnects LTE module 22 to/from first antenna 13a, and SPST second antenna switch 12b that connects and disconnects NR module 32 to/from second antenna 13b. First antenna switch 12a constitutes a portion of first transfer circuit 20. Second antenna switch 12b constitutes a portion of second transfer circuit 30, and is an example of a first switch that connects and disconnects the second transmitter circuit to/from the antenna. Antenna switch 12 controls turning on and off first antenna switch 12a and second antenna switch 12b, separately, under the control of RF signal processing circuit 11. Antenna switch 12 includes a plurality of FETs, for example.

First antenna 13a includes an antenna element suitable for transmitting and receiving signals in accordance with E-UTRA.

Second antenna 13b includes an antenna element suitable for transmitting and receiving signals in accordance with NR.

RF signal processing circuit (RFIC) 11 functions as a signal source that supplies radio frequency transmission signals obtained by modulating baseband signals to first transfer circuit 20 and second transfer circuit 30, functions as a receiving circuit that receives and demodulates radio frequency reception signals processed by first transfer circuit 20 and second transfer circuit 30, and functions as a control circuit that controls first transfer circuit 20 and second transfer circuit 30.

More specifically, when the terminal device is in an EN-DC operation mode, RF signal processing circuit 11 performs, as a control circuit, control to place the second transmitter circuit in a transmission halt state if a difference between (i) requested power of the second transmitter circuit that is the transmission power requested from the base station device and (ii) scheduled power of the second transmitter circuit that is the transmission power to be transmitted based on the requested power is greater than a predetermined value (for example, 6 dBm). Here, the transmission halt state is a state where a transmission signal is not supplied to an antenna, that is, radio waves to be transmitted are not radiated. In the transmission halt state, a receiving operation may be continuously performed or may be halted.

Here, specific control to place the second transmitter circuit in the transmission halt state includes at least one of: turning off second antenna switch 12b; turning off input switch 31; disconnecting, by transmission reception switch 35, the output terminal of power amplifier 33 from bandpass filter 36; stopping supply of power to power amplifier 33; or stopping, by RF signal processing circuit 11, supply of a transmission signal to the second transmitter circuit. Which control is to be selected is determined by, for example, a system processor (not illustrated) included in the terminal device providing designation for RF signal processing circuit 11 in accordance with a user instruction.

Note that RF signal processing circuit 11 may perform, for the first transmitter circuit instead of or in addition to the second transmitter circuit, control to place the first transmitter circuit in the transmission halt state if a difference between (i) requested power of the first transmitter circuit that is the transmission power requested from the base station device and (ii) scheduled power of the first transmitter circuit that is transmission power to be transmitted based on the requested power is greater than the predetermined value (for example, 6 dBm). Control to place the first transmitter circuit in the transmission halt state includes at least one of: turning off first antenna switch 12a; turning off input switch 21; disconnecting, by transmission reception switch 25, the output terminal of power amplifier 23 from bandpass filter 26; stopping supply of power to power amplifier 23; or stopping, by RF signal processing circuit 11, supply of a transmission signal to the first transmitter circuit.

Next, operation of communication circuit 10 according to the present embodiment having a configuration as above is to be described.

Figure 2:
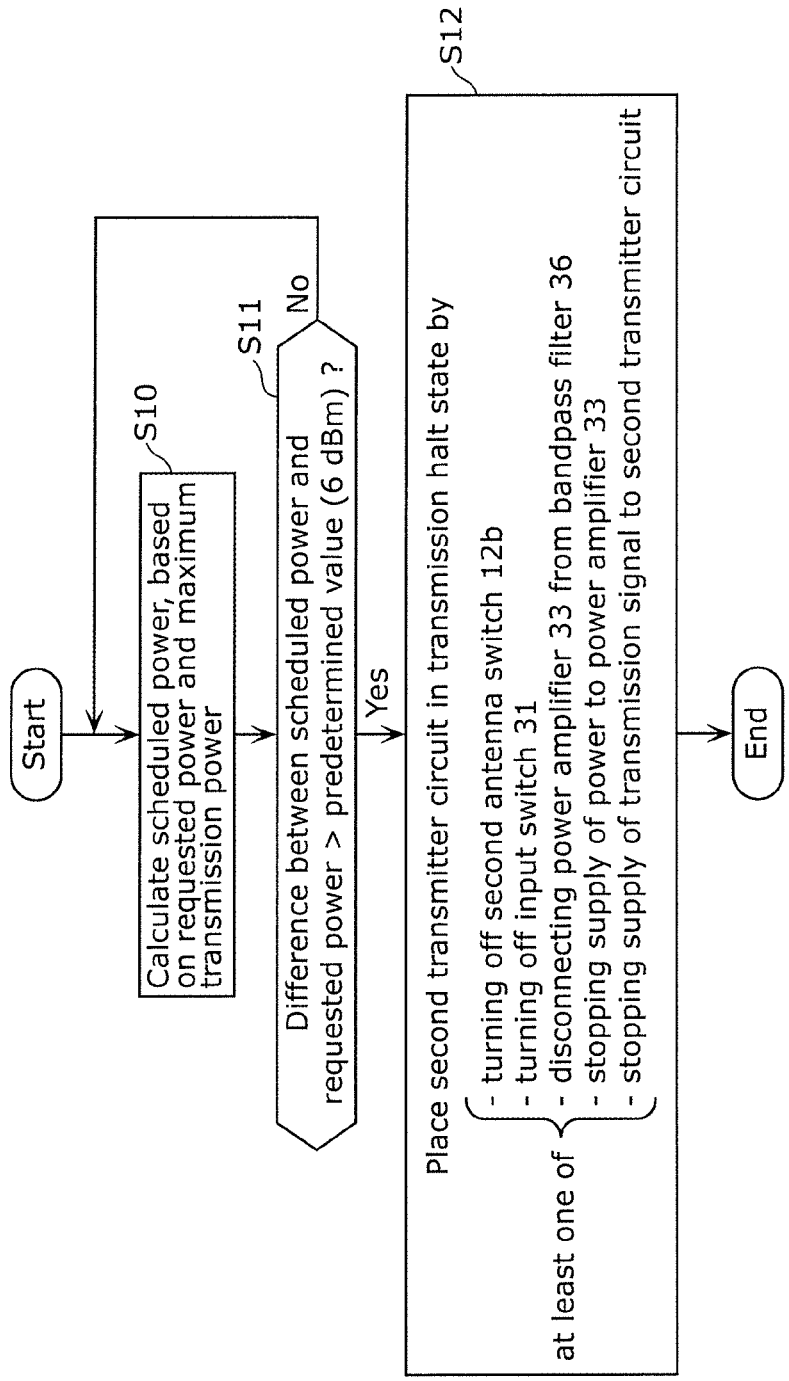
FIG. 2 is a flowchart illustrating operation of the communication circuit according to the embodiment.

FIG. 2 is a flowchart illustrating operation of communication circuit 10 according to the present embodiment. Here, the procedure of control by RF signal processing circuit 11 (that is, a control method for communication circuit 10) in EN-DC is illustrated.

It is assumed that the terminal device that includes communication circuit 10 is in an EN-DC operation mode, which allows first transfer circuit 20 (that is, the first transmitter circuit) and second transfer circuit 30 (that is, the second transmitter circuit) to simultaneously transmit signals.

RF signal processing circuit 11 calculates scheduled power of the second transmitter circuit that is transmission power to be transmitted based on requested power that is transmission power requested from the base station device, based on a difference between the requested power and maximum transmission power permitted for the second transmitter circuit (S10).

Next, RF signal processing circuit 11 determines whether a difference between the calculated scheduled power and the requested power is greater than the predetermined value (for example, 6 dBm) (S11).

If, as a result, RF signal processing circuit 11 determines that the difference between the scheduled power and the requested power is greater than the predetermined value (Yes in S11), RF signal processing circuit 11 performs control to place the second transmitter circuit in the transmission halt state (S12). Specifically, RF signal processing circuit 11 performs at least one of: turning off second antenna switch 12b; turning off input switch 31; disconnecting, by transmission reception switch 35, the output terminal of power amplifier 33 from bandpass filter 36; stopping supply of power to power amplifier 33; or stopping, by RF signal processing circuit 11, supply of a transmission signal to the second transmitter circuit.

Note that if RF signal processing circuit 11 determines that the difference between the scheduled power and the requested power is smaller than or equal to the predetermined value (No in S11), RF signal processing circuit 11 repeats the calculation of scheduled power (S10) and the determination (S11).

After placing the second transmitter circuit in the transmission halt state, RF signal processing circuit 11 monitors whether a difference between scheduled power and requested power falls down to or below the predetermined value, and cancels the transmission halt state of the second transmitter circuit (that is, places the second transmitter circuit in a transmission state).

Through the above processing, when the terminal device is in the EN-DC operation mode, if a difference between scheduled power and requested power in NR is greater than the predetermined value, the transmission halt state is maintained in NR, and thus a requirement that a difference between NR transmission power and requested power from the base station device be at most the predetermined value in EN-DC is complied with.

Figure 3:
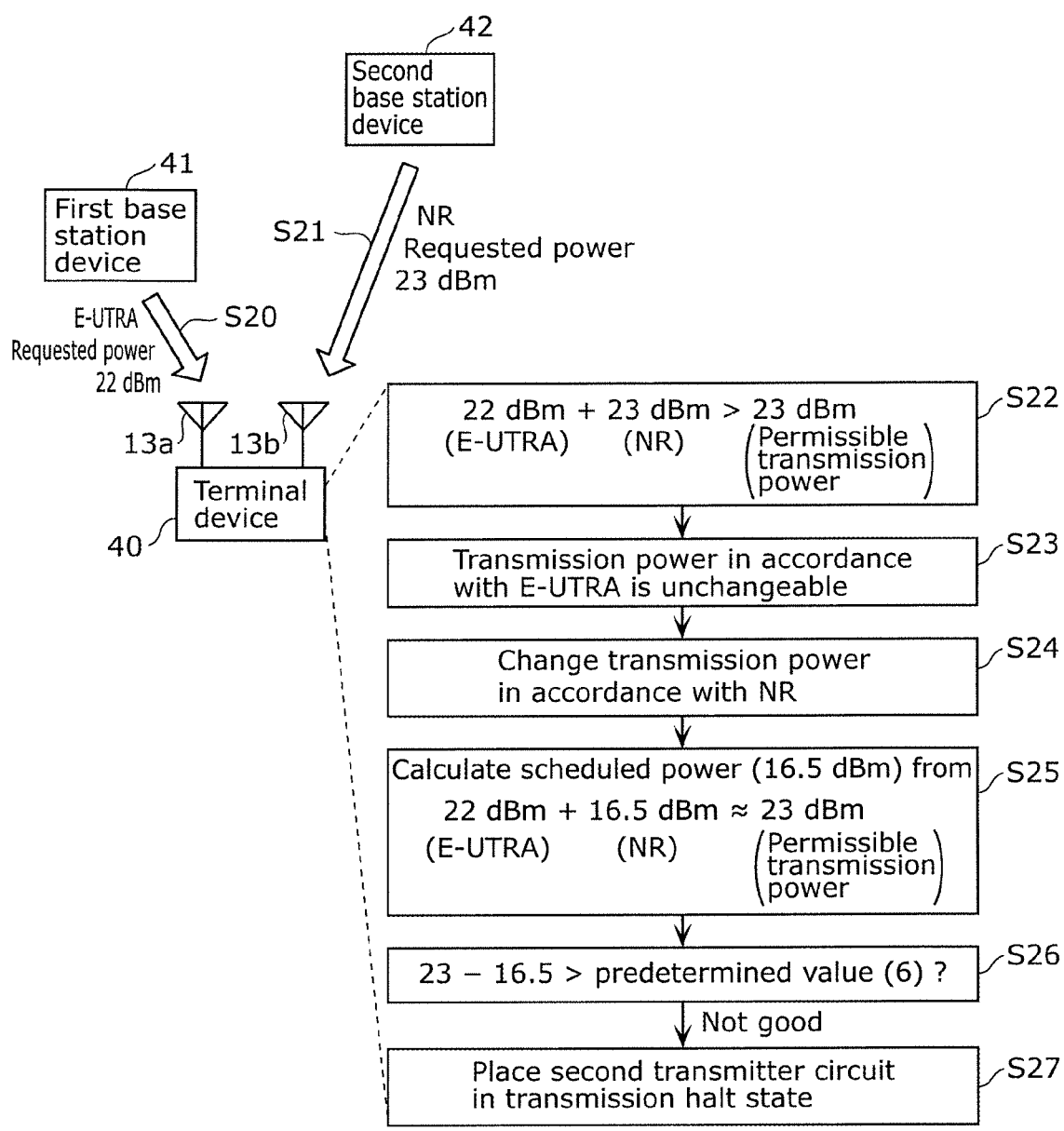
FIG. 3 illustrates a specific example of operation of the communication circuit illustrated in FIG. 2.

FIG. 3 illustrates a specific example of operation of communication circuit 10 illustrated in FIG. 2. Here, FIG. 3 illustrates a state in which terminal device 40 that includes communication circuit 10 according to the present embodiment is connected to first base station device 41 via first antenna 13a in accordance with E-UTRA, and is connected to second base station device 42 via second antenna 13b in accordance with NR, in the EN-DC operation mode.

Terminal device 40 can transmit a signal with power in a range of permissible transmission power defined for Power Class 3 (specifically, 23 dBm (typ.)).

Since requested power from first base station device 41 is 22 dBm, terminal device 40 transmits a signal with transmission power of 22 dBm to first base station device 41 in accordance with E-UTRA via first transfer circuit 20 (S20). Note that transmission power is detected using couplers (not illustrated) provided directly under first antenna 13a and second antenna 13b, and controlled and adjusted to a target value.

Requested power from second base station device 42 located farther from terminal device 40 than first base station device 41 is assumed to be 23 dBm in the state as above where first transfer circuit 20 transmits a signal in accordance with E-UTRA (S21).

In terminal device 40 that has been informed of the requested power (23 dBm) from second base station device 42, RF signal processing circuit 11 compares a sum of 22 dBm that is transmission power of first transfer circuit 20 and 23 dBm that is requested power of second transfer circuit 30 with 23 dBm that is permissible transmission power defined for Power Class 3, to obtain the result of adding logarithms, that is, 22 dBm+23 dBm>23 dBm. Thus, RF signal processing circuit 11 determines that total transmission power exceeds the permissible transmission power of terminal device 40 if second transfer circuit 30 transmits a signal in accordance with NR with transmission power equal to the requested power (S22).

Here, since transmission power in accordance with E-UTRA is unchangeable due to restrictions of the requirement (S23), RF signal processing circuit 11 calculates transmission power (that is, scheduled power) of second transfer circuit 30 in accordance with NR, which is close to the requested power of 23 dBm and satisfies the permissible transmission power of terminal device 40 (S24). Specifically, the result of adding logarithms shows 22 dBm+16.5 dBm≈23 dBm, and thus RF signal processing circuit 11 calculates, as scheduled power, 16.5 dBm that is the maximum transmission power of second transfer circuit 30 in accordance with NR (S25).

RF signal processing circuit 11 determines whether a difference between 16.5 dBm that is the calculated scheduled power and 23 dBm that is the requested power (stated differently, a difference between dBm values) is greater than the predetermined value (here, 6) (S26). In this example, the difference between scheduled power and requested power (that is, the difference between dBm values which is 6.5 dBm) is greater than the predetermined value (6), and thus RF signal processing circuit 11 determines that the difference between scheduled power and requested power is greater than the predetermined value ("Not good" in S26), and performs control to place second transfer circuit 30 in the transmission halt state to stop NR transmission (S27).

Accordingly, when a difference between transmission power and requested power in NR cannot be made the predetermined value or smaller, the transmission halt state is maintained in NR, and thus the requirement that a difference between NR transmission power and requested power from the base station device be at most the predetermined value in EN-DC is complied with.

As described above, communication circuit 10 according to the present embodiment includes: first transfer circuit 20 that includes a first transmitter circuit; and second transfer circuit 30 that includes a second transmitter circuit configured to transmit a signal simultaneously with first transmitter circuit 20. The second transmitter circuit is configured to be placed in a transmission halt state when a difference between requested power and scheduled power is greater than a predetermined value, the requested power being requested transmission power, the scheduled power being transmission power to be transmitted based on the requested power.

Accordingly, when a difference between requested power and scheduled power of the second transmitter circuit is greater than the predetermined value, the second transmitter circuit is placed in the transmission halt state, and thus the requirement that a difference between NR transmission power and requested power from the base station device be at most the predetermined value in EN-DC can be complied with when the first transmitter circuit transmits a signal in accordance with E-UTRA and the second transmitter circuit transmits a signal in accordance with NR, for example.

Here, the second transmitter circuit includes: second antenna switch 12b configured to connect the second transmitter circuit to second antenna 13b, and disconnect the second transmitter circuit from second antenna 13b, and the second transmitter circuit is configured to be placed in the transmission halt state by second antenna switch 12b being turned off. Accordingly, the second transmitter circuit is disconnected from second antenna 13b, which ensures that the second transmitter circuit is placed in the transmission halt state.

The second transmitter circuit includes: power amplifier 33; input switch 31 connected to the input terminal of power amplifier 33; and transmission reception switch 35 connected to the output terminal of power amplifier 33, and input switch 31 is turned off or transmission reception switch 35 disconnects the output terminal of power amplifier 33 from a circuit disposed downstream thereof. Accordingly, power amplifier 33 is disconnected in the second transmitter circuit, which ensures that the second transmitter circuit is placed in the transmission halt state.

The second transmitter circuit includes power amplifier 33, and is configured to be placed in the transmission halt state by supply of power to power amplifier 33 being stopped. Accordingly, supply of power to power amplifier 33 is stopped, and thus the second transmitter circuit is caused to stop transmission operation so as to be placed in the transmission halt state, and furthermore power consumption of the second transmitter circuit is reduced in the transmission halt state.

Communication circuit 10 further includes: RF signal processing circuit 11 as a signal source configured to supply a transmission signal to the second transmitter circuit. The second transmitter circuit is configured to be placed in the transmission halt state by RF signal processing circuit 11 stopping supply of the transmission signal to the second transmitter circuit. Accordingly, no transmission signal is input to the second transmitter circuit, which ensures that the second transmitter circuit is placed in the transmission halt state.

The second transmitter circuit is configured to transmit a signal with transmission power lower than transmission power of the first transmitter circuit. Accordingly, for example, when the first transmitter circuit transmits a signal in accordance with E-UTRA in which transmission power is higher, and the second transmitter circuit transmits a signal in accordance with NR in which transmission power is lower, the requirement that a difference between NR transmission power and requested power from the base station device be at most the predetermined value in EN-DC is complied with.

One of the first transmitter circuit and the second transmitter circuit is configured to transmit a signal in accordance with a fourth generation mobile communication system, and another of the first transmitter circuit and the second transmitter circuit is configured to transmit a signal in accordance with a fifth generation mobile communication system. Specifically, one of the first transmitter circuit and the second transmitter circuit transmits a signal in accordance with E-UTRA, and the other of the first transmitter circuit and the second transmitter circuit transmits a signal in accordance with NR. For example, a frequency band in which the one of the first transmitter circuit and the second transmitter circuit is configured to transmit a signal and a frequency band in which the other of the first transmitter circuit and the second transmitter circuit is configured to transmit a signal are a combination of: E-UTRA band B2 and NR band n66; E-UTRA band B3 and NR band n77; E-UTRA band B3 and NR band n78; E-UTRA band B13 and NR band n26; E-UTRA band B20 and NR band n28; E-UTRA band B26 and NR band n71; E-UTRA band B42 and NR band n77; or E-UTRA band B42 and NR band n78.

Accordingly, for example, when the first transmitter circuit transmits a signal in accordance with E-UTRA, and the second transmitter circuit transmits a signal in accordance with NR, the requirement that a difference between NR transmission power and requested power from the base station device be at most the predetermined value in EN-DC is complied with.

Scheduled power is a value calculated based on a difference between maximum transmission power permitted for the second transmitter circuit and requested power thereof. Accordingly, scheduled power is calculated based on the maximum transmission power permitted for the second transmitter circuit, and thus the second transmitter circuit is prevented from transmitting a signal with transmission power that exceeds the permissible maximum transmission power.

Communication circuit 10 further includes: RF signal processing circuit 11 as a control circuit configured to perform control to place the second transmitter circuit in the transmission halt state when the difference between the requested power and the scheduled power is greater than the predetermined value. The control circuit is configured to: calculate the scheduled power, based on a difference between the requested power and maximum transmission power permitted for the second transmitter circuit; determine whether a difference between the requested power and the scheduled power calculated is greater than the predetermined value; and perform the control when the control circuit determines that the difference between the requested power and the scheduled power is greater than the predetermined value. Accordingly, when a difference between requested power and scheduled power is greater than the predetermined value, the second transmitter circuit is placed in the transmission halt state under the control of the control circuit.

A control method for communication circuit 10 according to the present embodiment is a control method for communication circuit 10 that includes a first transmitter circuit, and a second transmitter circuit configured to transmit a signal simultaneously with the first transmitter circuit, the control method including: calculating, for the second transmitter circuit, scheduled power, based on a difference between maximum transmission power and requested power that is requested transmission power, the scheduled power being transmission power to be transmitted based on the requested power (S10); determining whether a difference between the requested power and the scheduled power calculated is greater than a predetermined value (S11); and performing control to place the second transmitter circuit in a transmission halt state when the difference between the requested power and the scheduled power is determined to be greater than the predetermined value (S12).

Accordingly, when a difference between requested power of the second transmitter circuit and scheduled power thereof is greater than the predetermined value, the second transmitter circuit is paced in the transmission halt state. Thus, the requirement that a difference between NR transmission power and requested power from the base station device be at most the predetermined value in EN-DC is complied with when the first transmitter circuit transmits a signal in accordance with E-UTRA, and the second transmitter circuit transmits a signal in accordance with NR, for example.

The above has described the communication circuit and the control method for the communication circuit according to the present disclosure based on the embodiment, yet the present disclosure is not limited to this embodiment. The present disclosure also encompasses other embodiments obtained by applying various changes that may be conceived by a person skilled in the art to the embodiment and by combining some of the elements in the embodiment without departing from the scope of the present disclosure.

For example, in the above embodiment, communication circuit 10 may include a baseband signal processing circuit (BBIC). At this time, the baseband signal processing circuit not only processes a baseband signal, but may also have a function as a control circuit achieved by RF signal processing circuit 11, instead of or in addition to RF signal processing circuit 11. Thus, the baseband signal processing circuit may perform control to place the second transmitter circuit in the transmission halt state.

In the above embodiment, when a difference between requested power and scheduled power is greater than the predetermined value, the second transmitter circuit is placed in the transmission halt state in NR in which transmission power is lower, whereas a transmitter circuit having higher transmission power out of the first transmitter circuit and the second transmitter circuit may be placed in the transmission halt state when the difference between requested power and scheduled power is greater than the predetermined value.

In the above embodiment, communication circuit 10 not only transmits a signal, but also receives a signal, yet communication circuit 10 may only transmits a signal. Furthermore, first transfer circuit 20 and second transfer circuit 30 transmit and receive signals in accordance with E-UTRA and NR, but may transmit and receive signals in accordance with other mobile communication systems. The present disclosure is applicable to DC for simultaneous transmission using any two of the mobile communication systems.

Further, the control method for the communication circuit according to the present disclosure may be achieved as a program for causing a processor to perform the steps included in the control method, and a non-transitory recording medium such as a CD-ROM that stores the program.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used in, for example, communication apparatuses such as a mobile phone, as a communication circuit that includes two transmitter circuits that can simultaneously transmit signals, or in particular, as a communication circuit that can perform communication in compliance with the requirements in EN-DC.

The invention claimed is:
1. A communication circuit, comprising:
a first transmitter circuit; and
a second transmitter circuit configured to transmit a signal simultaneously with the first transmitter circuit,
wherein the second transmitter circuit is configured to be in a transmission halt state when a difference between a requested transmission power and a scheduled power is greater than a predetermined value, the scheduled power being a transmission power based on the requested power.
2. The communication circuit according to claim 1, wherein:
the second transmitter circuit comprises a first switch configured to selectively connect the second transmitter circuit to an antenna, and to selectively disconnect the second transmitter circuit from the antenna, and
the second transmitter circuit is configured to be in the transmission halt state when first switch is in an OFF state.
3. The communication circuit according to claim 1, wherein:
the second transmitter circuit comprises:
a power amplifier; and
a second switch connected to an input terminal or to an output terminal of the power amplifier, and
the second transmitter circuit is configured to be in the transmission halt state when the second switch is in an OFF state.
4. The communication circuit according to claim 1, wherein the second transmitter circuit comprises a power amplifier, and is configured to be in the transmission halt state when a supply of power to the power amplifier is stopped.
5. The communication circuit according to claim 1, further comprising:
a signal source configured to supply a transmission signal to the second transmitter circuit,
wherein the second transmitter circuit is configured to be in the transmission halt state when the signal source stops supply of the transmission signal to the second transmitter circuit.
6. The communication circuit according to claim 1, wherein the second transmitter circuit is configured to transmit a signal having a transmission power less than a transmission power of the first transmitter circuit.
7. The communication circuit according to claim 1, wherein:
the first transmitter circuit or the second transmitter circuit is configured to transmit a first signal in accordance with a fourth generation mobile communication system, and
the other of the first transmitter circuit or the second transmitter circuit is configured to transmit a second signal in accordance with a fifth generation mobile communication system.
8. The communication circuit according to claim 7, wherein:
the first transmitter circuit or the second transmitter circuit is configured to transmit the first signal in accordance with Evolved Universal Terrestrial Radio Access (E-UTRA), and
the other of the first transmitter circuit or the second transmitter circuit is configured to transmit the second signal in accordance with New Radio (NR).
9. The communication circuit according to claim 8, wherein a frequency band in which the first transmitter circuit or the second transmitter circuit is configured to transmit the first signal, and a frequency band in which the other of the first transmitter circuit or the second transmitter circuit is configured to transmit the second signal are, respectively:
E-UTRA band B2 and NR band n66;
E-UTRA band B3 and NR band n77;
E-UTRA band B3 and NR band n78;
E-UTRA band B13 and NR band n26;
E-UTRA band B20 and NR band n28;
E-UTRA band B26 and NR band n71;
E-UTRA band B42 and NR band n77; or
E-UTRA band B42 and NR band n78.

10. The communication circuit according to claim 1, wherein the scheduled power is based on a difference between the requested power and a maximum transmission power permitted for the second transmitter circuit.

11. The communication circuit according to claim 1, further comprising:
a control circuit configured to place the second transmitter circuit in the transmission halt state when the difference between the requested power and the scheduled power is greater than the predetermined value.

12. The communication circuit according to claim 11, wherein the control circuit is configured to:
calculate the scheduled power based on a difference between the requested power and a maximum transmission power permitted for the second transmitter circuit;
determine whether the difference between the requested power and the calculated scheduled power is greater than the predetermined value; and
place the second transmitter circuit in the transmission halt state when the control circuit determines that the difference between the requested power and the scheduled power is greater than the predetermined value.

13. A control method for a communication circuit that comprises a first transmitter circuit, and a second transmitter circuit configured to transmit a signal simultaneously with the first transmitter circuit, the control method comprising:
calculating, for the second transmitter circuit, a scheduled power based on a difference between a maximum transmission power and a requested transmission power;
determining whether a difference between the requested power and the calculated scheduled power is greater than a predetermined value; and
placing the second transmitter circuit in a transmission halt state when the difference between the requested power and the scheduled power is determined to be greater than the predetermined value.

14. The control method according to claim 13, wherein the second transmitter circuit is placed in the transmission halt state by disconnecting the second transmitter circuit from an antenna.

15. The control method according to claim 13, wherein the second transmitter circuit is placed in the transmission halt state by disconnecting an input terminal or an output terminal of a power amplifier of the second transmitter circuit.

16. The control method according to claim 13, wherein the second transmitter circuit is placed in the transmission halt state by stopping a supply of power to a power amplifier of the second transmitter circuit.

17. The control method according to claim 13, wherein the second transmitter circuit is placed in the transmission halt state by stopping a supply of a transmission signal to the second transmitter circuit.

18. The control method according to claim 13, further comprising:
transmitting, with the second transmitter circuit, a signal having a transmission power less than a transmission power of the first transmitter circuit.

19. The control method according to claim 13, further comprising:
transmitting, with the first transmitter circuit or the second transmitter circuit, a first signal in accordance with a fourth generation mobile communication system, and
transmitting, with the other of the first transmitter circuit or the second transmitter circuit, a second signal in accordance with a fifth generation mobile communication system.

* * * * *